US012290819B2

(12) United States Patent
Raichart

(10) Patent No.: US 12,290,819 B2
(45) Date of Patent: May 6, 2025

(54) GRINDER STEMMER AND RELATED METHODOLOGIES

(71) Applicant: Cullen Raichart, Las Vegas, NV (US)

(72) Inventor: Cullen Raichart, Las Vegas, NV (US)

( * ) Notice: Subject to any disclaimer, the term of this patent is extended or adjusted under 35 U.S.C. 154(b) by 262 days.

(21) Appl. No.: 17/962,754

(22) Filed: Oct. 10, 2022

(65) Prior Publication Data

US 2024/0116058 A1 Apr. 11, 2024

(51) Int. Cl.
*B02C 18/14* (2006.01)
*B02C 18/22* (2006.01)
*B02C 23/16* (2006.01)

(52) U.S. Cl.
CPC ........ *B02C 18/144* (2013.01); *B02C 18/2291* (2013.01); *B02C 2023/165* (2013.01)

(58) Field of Classification Search
CPC ......... B02C 23/08; B02C 23/10; B02C 23/14; B02C 23/16; B02C 2023/165; B02C 18/067; B02C 18/062; B02C 18/144
See application file for complete search history.

(56) References Cited

U.S. PATENT DOCUMENTS 1,706,643 A * 3/1929 Wiley ................... B02C 18/144 241/73
1,721,183 A * 7/1929 McKain ................ B02C 18/144 241/73
2,225,781 A * 12/1940 Hinerfeld .............. B02C 18/144 241/49
3,584,796 A * 6/1971 Earle ..................... B02C 18/144 241/4
4,073,444 A * 2/1978 Pav ....................... B02C 18/144 241/73
2006/0105681 A1* 5/2006 Gardzinski ............... B24B 5/22 451/142
2017/0128950 A1* 5/2017 Dueck ..................... B02C 18/20
2022/0168748 A1* 6/2022 Rogers .................... B02C 18/24

FOREIGN PATENT DOCUMENTS

WO WO-2021074411 A1 * 4/2021 ........... B02C 18/144

OTHER PUBLICATIONS

Translation of WO-2021074411 (Year: 2021).*

* cited by examiner

*Primary Examiner* — Bobby Yeonjin Kim
(74) *Attorney, Agent, or Firm* — The Buche Law Firm, PC; Bryce A. Johnson; John K. Buche

(57) ABSTRACT

Disclosed is a continuous feed commercial cannabis bud grinder and stemmer that enables operations to control the grinds size, remove stems from the buds, and avoid damage to the bud's trichomes. In a preferred embodiment, raw material (buds) are top loaded into a grinding assembly defined by a motor driven blade that tumbles or sweeps the raw material such that the buds are destemmed and bud grinds are forced through a perforated insert. Suitably, grinds fall from the perforated insert into a secondary filtering process where the grinds can be filtered by size before output to a user.

16 Claims, 7 Drawing Sheets

GRINDER STEMMER AND RELATED METHODOLOGIES

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of continuous feed commercial grinders and stemmers.

Background of the Invention

In the cannabis industry it is often desirable to grind the cannabis buds such that the grinds can be rolled into paper and smoked for medicinal or recreational purposes. When large quantities of cannabis buds are ground at once, care must be taken so that the trichomes of the buds are not damaged during the grinding process. In particular, known commercial grinders can damage trichomes by pulverizing the buds to dust or burning the grinds by friction of the machines moving parts. Other unsatisfactory aspects of commercial grinders are that they are susceptible to microbial growth. Thus, a need exits for an industrial or commercial grinder that is sanitary and that does not damage the trichomes during the grinding process.

SUMMARY OF THE INVENTION

In view of the foregoing, an object of this specification is to disclose a continuous feed commercial cannabis bud grinder and stemmer that enables operations to control the grinds size, remove stems from the buds, and avoid damage to the bud's trichomes. In a preferred embodiment, raw material (buds) are top loaded into a grinding assembly defined by a motor driven blade that tumbles or sweeps the raw material such that the buds are destemmed and bud grinds are forced through a perforated insert. Suitably, grinds fall from the perforated insert into a secondary filtering process where the grinds can be filtered by size before output to a user.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFFERED EMBODIMENTS

Disclosed is a continuous feed commercial cannabis bud grinder and stemmer. In general, the grinder/stemmer is defined by a motor driven grinding assembly, with a rotatable blade that dismantles (grinds) buds by tumbling the buds over a perforated insert such that bud grinds are forced the perforations of the perforated insert. Suitably, once the grinds are forced through the perforated insert, the grind material is caught by a sifting frame, which uses oscillation and rotational motion to gently move the grind material over a perforated metal plate, with perforation sized to the grind material by sized. The more specific aspects of the disclosed grinder/stemmer are described with reference to the appended Figures.

Figure 1:
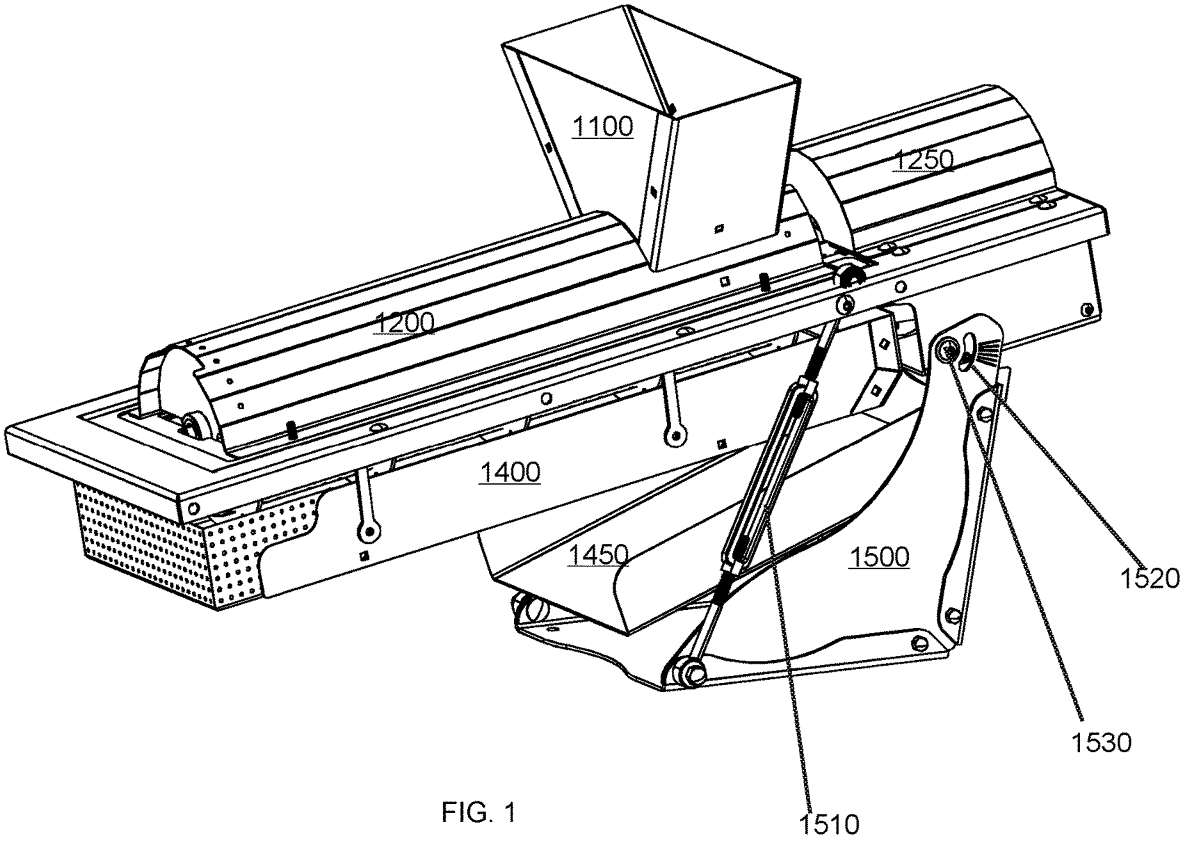
FIG. 1 is a perspective view of a grinder and stemmer.
Figure 2:
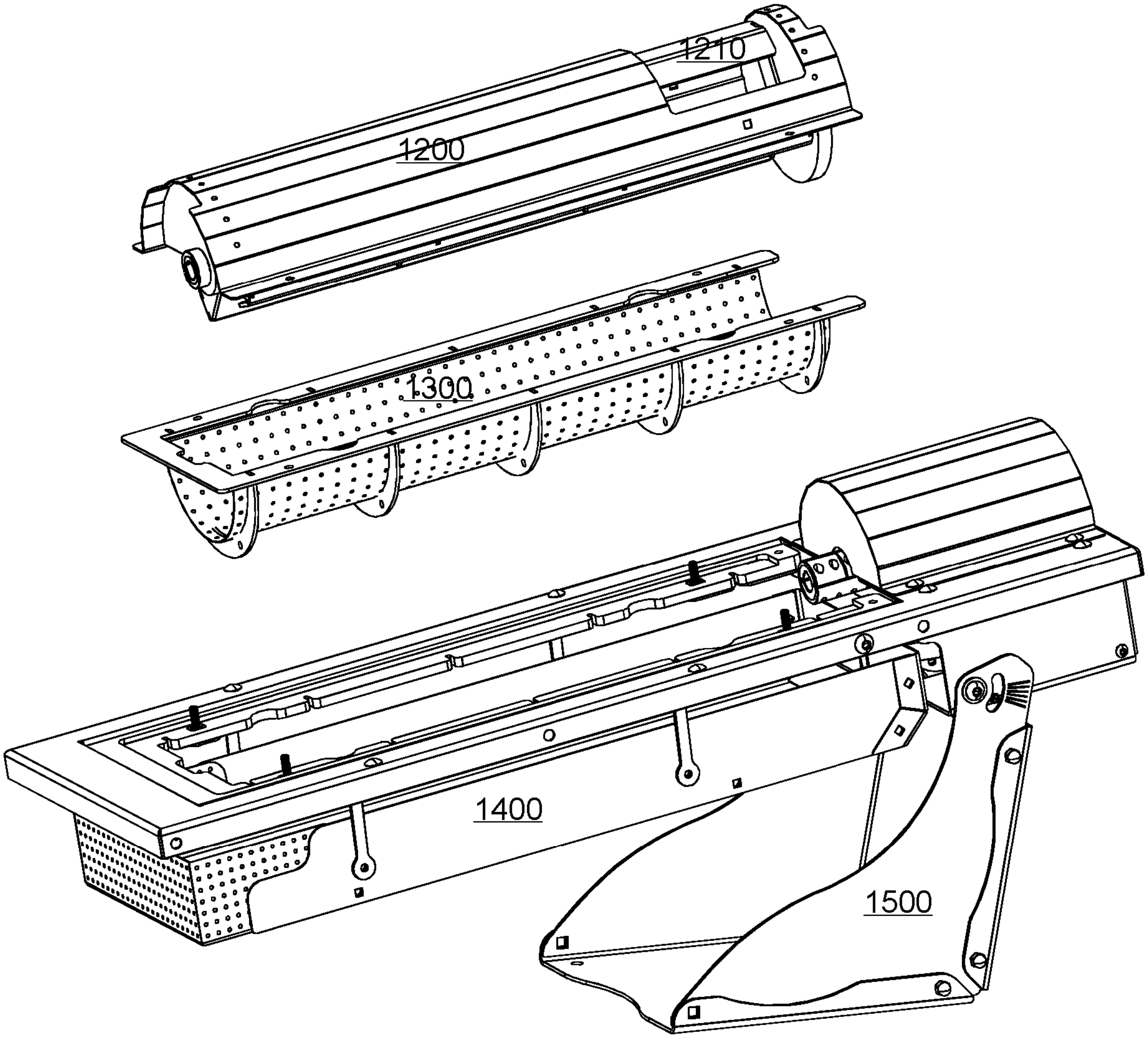
FIG. 2 is an exploded perspective view of a grinder and stemmer.

FIG. 1 is a perspective view of a grinder/stemmer 1000. FIG. 2 is an exploded perspective view of the grinder/stemmer 1000. As shown, the grinder 1000 is defined by a hopper 1100, a grinding assembly 1200 attached to a motor 1250, a perforated insert 1300, sifting frame 1400, and a base 1500.

In a preferred embodiment shown in FIGS. 1 and 2, raw material (buds) are top loaded into a grinding assembly defined by a motor driven blade 1210 that tumbles or sweeps the raw material within the grinding assembly 1200 such that the buds are destemmed and bud grinds are forced through the perforated insert 1300. Suitably, the grinding assembly 1200 is driven by the motor 1250 at a low RPM (revolutions per minute) and is angled downward such that tumbled materials tends by gravity toward the lower portion of the grinding assembly 1200. Preferably, the low RPM sweeping motion and the gravity driven flow of the grinding assembly aligns the stems with the blades to gently remove the buds from the stem without destroying the stems. In one view, low RPM of the blade reduces heat that could result from the friction of moving parts. Preferably, the blade rotation rate may be as slow as one hundredth of a revolution per second but a preferred embodiment may be one third to one revolution per second or lower.

As shown, the base has a jack 1510 and a compass 1520 so that the angle of incline (around a pivot 1530) can be set according to a user's preference or to a specific strain. Ultimately, the grinds are provided through the perforations of the perforated insert 1300 (which perforations can be customized such that the perforations result in a grind of a desired size (grind size). Suitably, grinds fall from the perforated insert 1300 into a secondary filtering process where the grinds can be filtered by size before output to a user via the tray 1450. Suitably, the secondary filtering process is accomplished via the sifting assembly 1400, which uses oscillation and rotational motion to move the material forward over a perforated metal plate creating a secondary filtering process to further remove stems from the final product (grind) output.

Figure 3:
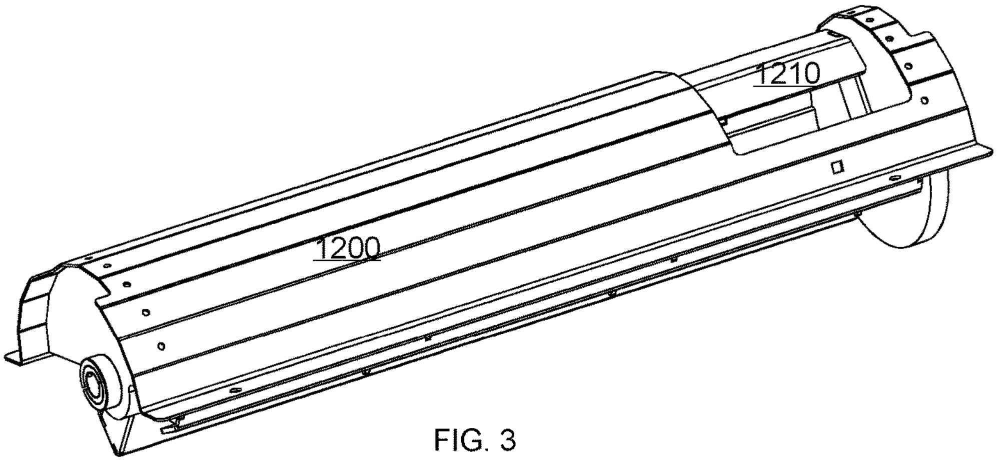
FIG. 3 is a perspective view of a preferred embodiment of a grinding assembly.
Figure 4:
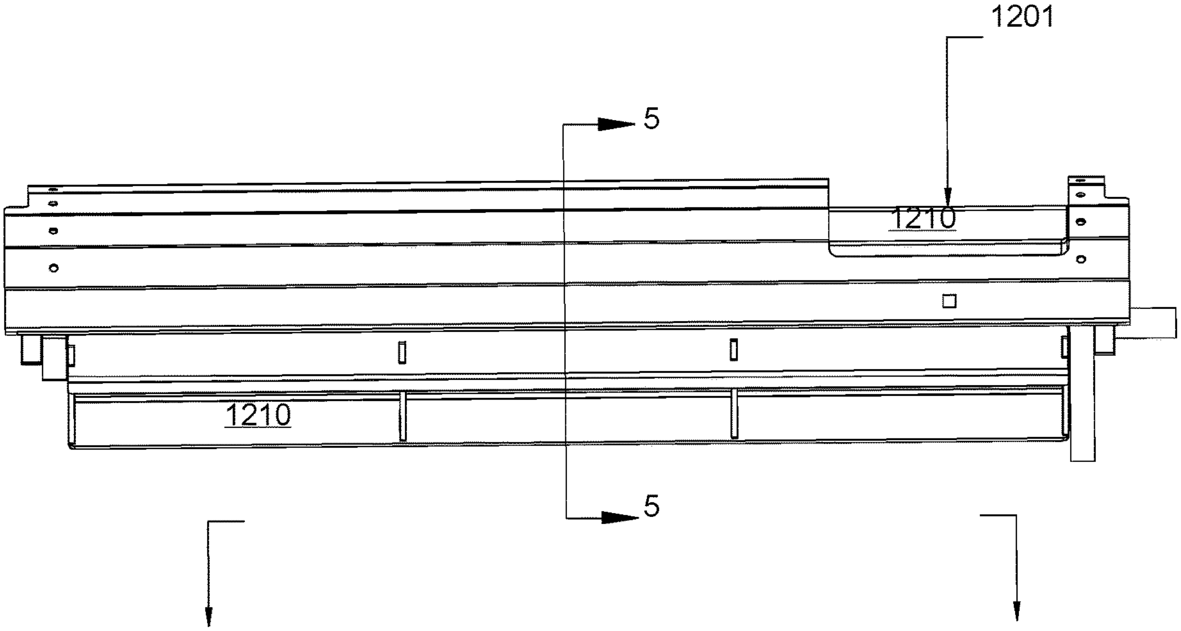
FIG. 4 is a side view of the grinding assembly of FIG. 3.
Figure 5:
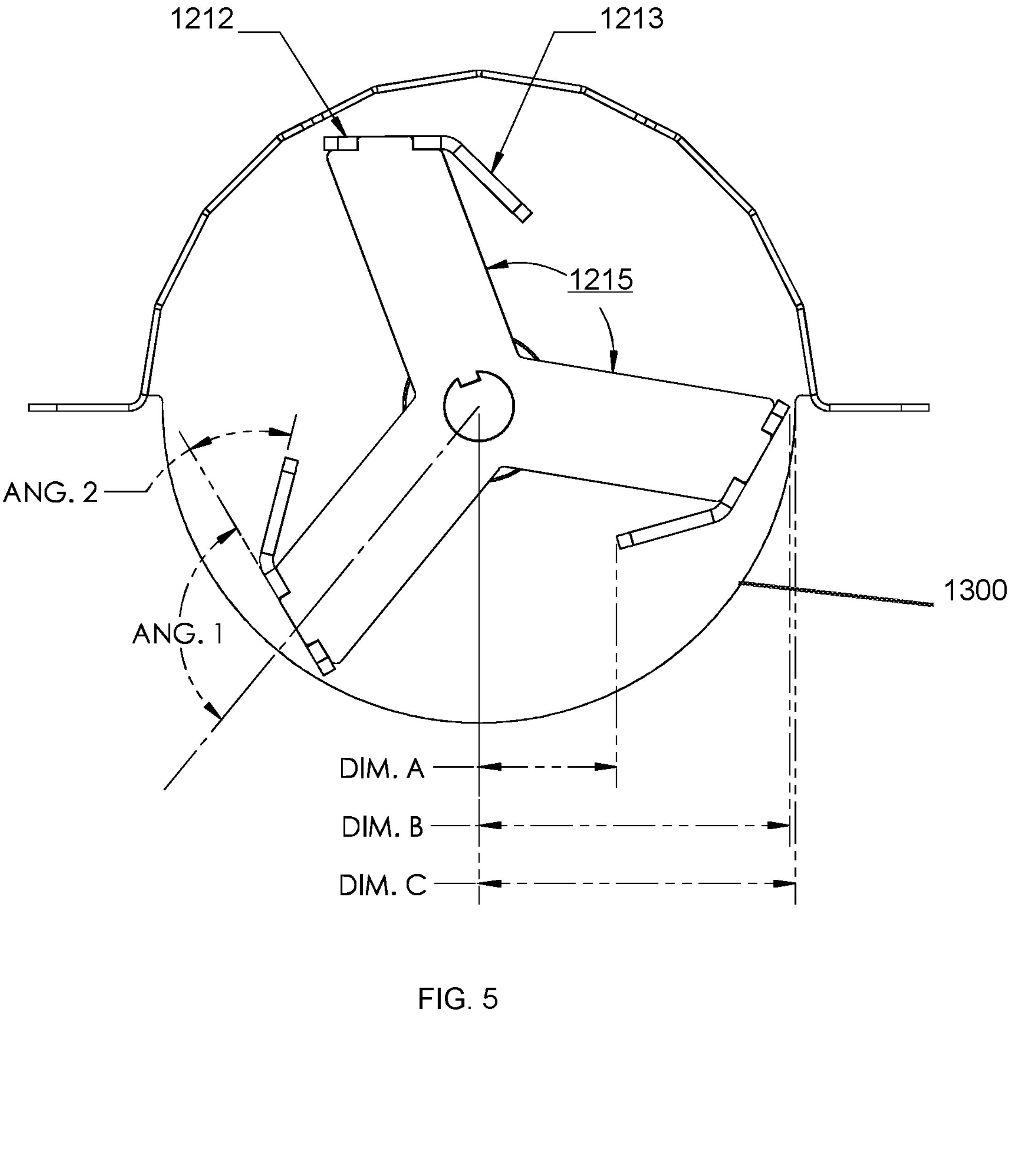
FIG. 5 is a cross section of the grinding assembly of FIG. 4.

FIGS. 3 through 5 are various views of the grinding assembly 1200. As best shown in FIGS. 3 and 4, grinding assembly 1200 has a material inlet 1201 through which raw material (buds with stems) can be provided into the grinding assembly, e.g., via the hopper 1100 (shown in FIG. 1). As depicted in the preferred embodiment, the assembly is suitably tubular such that the blades 1210 can rotate (direction arrows 1215) therein to tumble any deposited buds. As best shown in FIG. 4, the blades 1210 feature an axle 1211 that may be attached to the low RPM motor 1250 (Shown in FIG. 1). As best shown in FIG. 5 (cross section taken along line 5-5 of FIG. 4), the blades 1210 rotate within the tubular assembly and are defined by a pinch face 1212 and an open face 1213. The assembly may preferably use low RPM, angled gravity driven flow, and a sweeping motion to align the stems with the open face 1213 of the blades 1210 and gently removes the material buds without destroying the stems. Suitably, the distance between the open face tip and the center of the assembly 1220 (DIM. A) is optimized for stem removal. The stems are moved down and away from the input 1201 and fall through the sifting insert 1300 (discussed later in connection with FIGS. 6 through 8). As shown, the blade may suitably be dimensioned such that the open face 1213 is angled relative to the pinch face 1212 (ANG. 2) and the pinch face 1212 may be angled relative to the centerline radius of the blade (ANG. 1). Suitably, the above identified angles provide a customizable clearance (e.g. DIM. C less DIM. B) such that the buds can be pinched against the sifting blade (1300) (discussed below) and grinds fall out the bottom of the assembly 1200.

Figure 6:
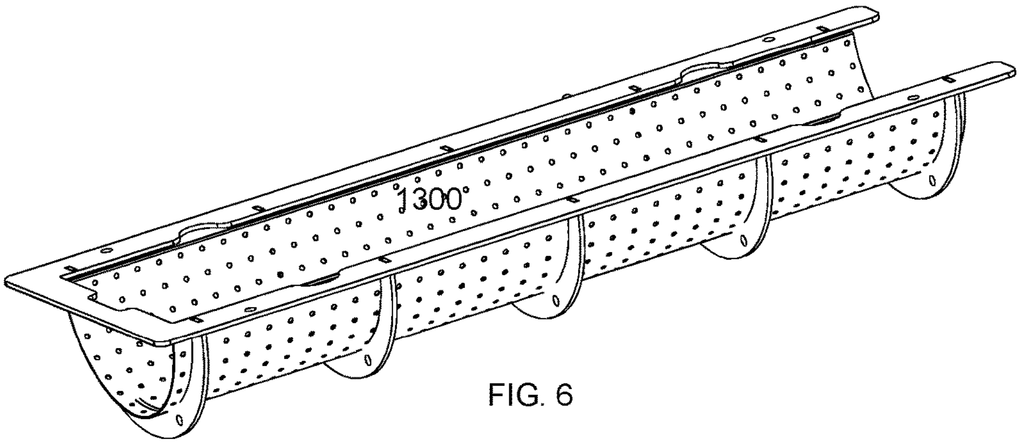
FIG. 6 is a perspective view of a perforated insert.
Figure 7:
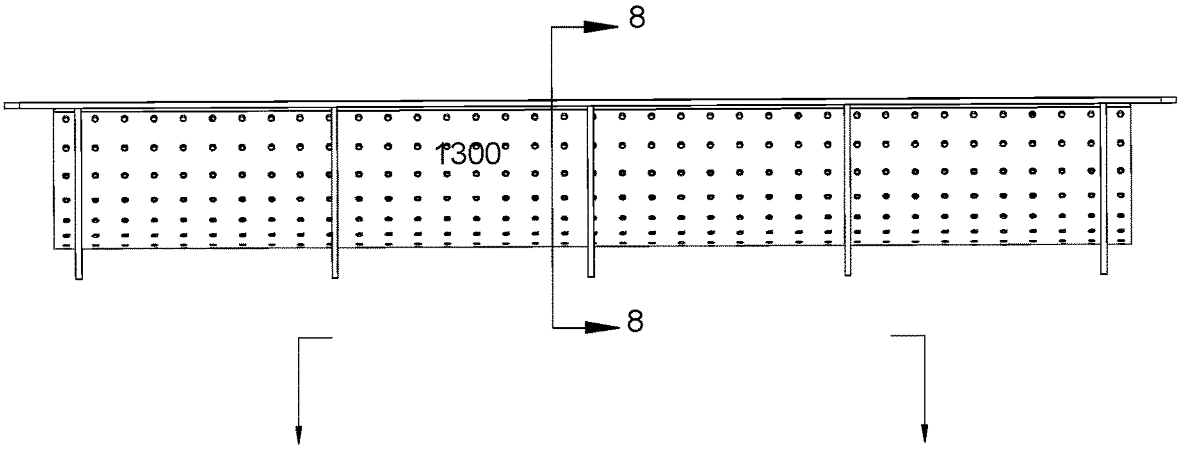
FIG. 7 is a side view of the perforated insert of FIG. 6.
Figure 8:
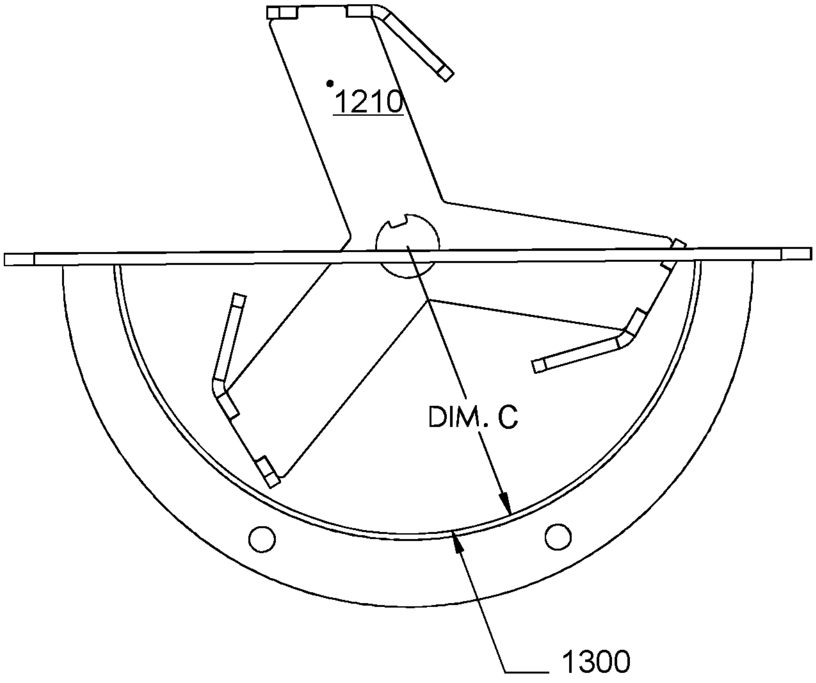
FIG. 8 is a cross section of the perforated insert of FIG. 7 (blades of the grinding assembly shown for context)

FIG. 6 is a perspective view of a perforated insert 1300. FIGS. 7 and 8 are respectively a side view of the insert 1300 and a cross section of the insert 1300 along line 8-8 (of FIG. 7). As shown, the perforated insert (with variable and non-variable perforation patterns and sizes) provides control of the grind material size. Suitably, the raw material is sandwiched or pinched between the pinch face 1212 of the blade 1210 and the perforated insert 1300 such that the blades sweep the material across the insert to force material through and into the sifting frame assembly (1400 FIG. 1). Preferably, the perforated insert may be removable for cleaning or changing perforation size.

Figure 9:
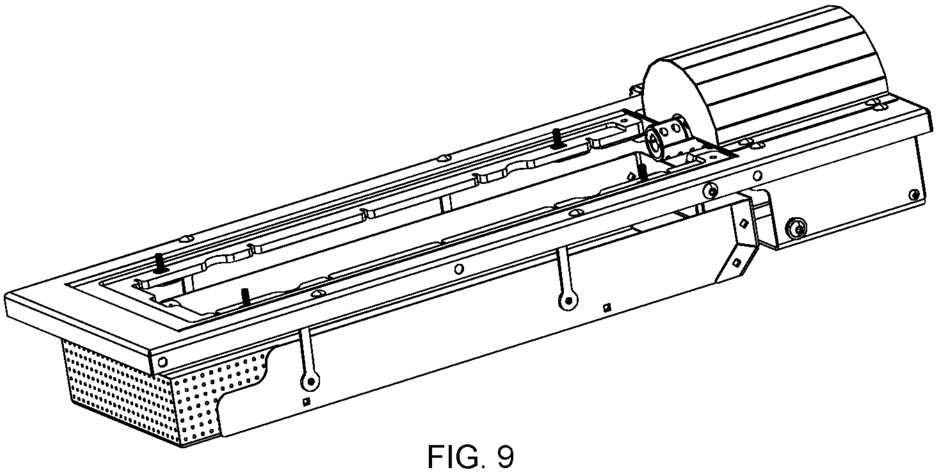
FIG. 9 is a perspective view of the shifting frame assembly.
Figure 10:
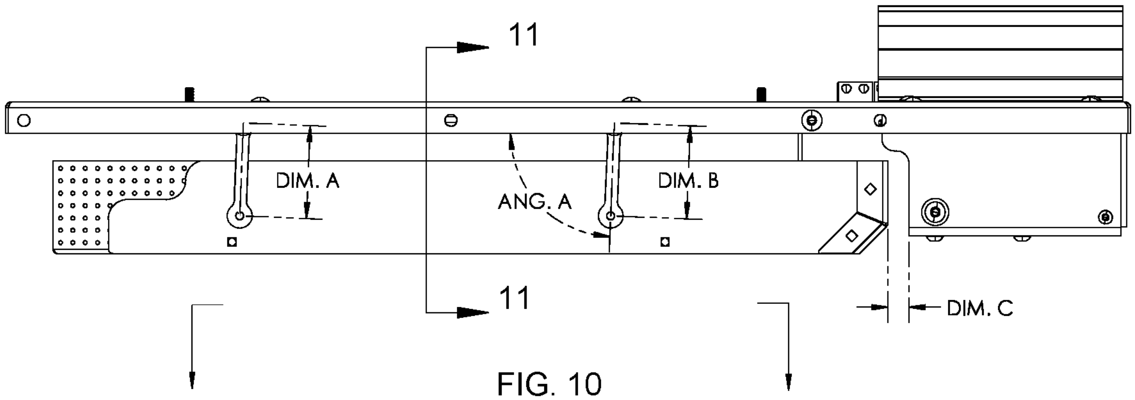
FIG. 10 is a side view of the shifting frame assembly.
Figure 11:
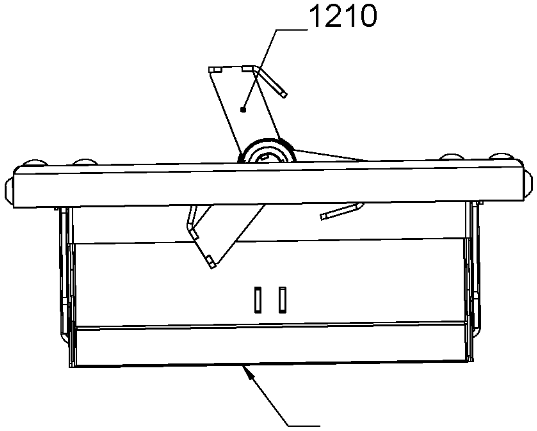
FIG. 11 is a cross section of the shifting frame assembly (blades of the grinding assembly shown for context).

FIG. 9 is a perspective view of the shifting frame assembly 1400. FIG. 10 is a side view of the shifting frame assembly 1400. FIG. 11 is a cross section of the shifting frame assembly 1400 (taken along line 11-11 in FIG. 10). As shown, the sifting frame assembly is the base of the grinder 1000, where grinds are output from the grinding assembly 1200 and perforated insert. The sifting frame assembly 1400 holds the motor and is attached to the base 1500. Suitably, the sifting frame assembly catches grinds from the perforations of the perforated insert 1300 (not shown) and then the sifting frame assembly oscillates and rotates via swing arms 1410 such that grinds are moved forward over the perforated plate such that the grinds are again filtered by size of the perforations.

Suitably, the swing arms 1410 are adjustable in length (DIM. A and DIM. B) such that an operator may manipulate the relative angle between the perforated metal sheet 1420 and the sifting frame itself. Back and forth motion is also provided via the swing arm (e.g., to open and close repeatedly) the distance between the tray and the assembly (DIM. C). swinging the tray e.g. around a pivot (ANG. A) can controlled via adjusting the distance a swing (DIM C) such that a larger swing would result in a more vigorous oscillation. Suitably, the perforated diameter of the metal sheet can be customized such that grinds of a particular size can be harvested. Suitably, grinds may be pushed through perforations in the insert and tray that are ⅛ inch, 5/32 inch and/or 3/16 inch.

In a preferred embodiment, components of the grinder 1000 may be made of stainless steel. Suitably, stainless steel reduces microbial growth. Suitably, the hopper ca Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A grinder assembly comprising:

a hopper;

a tubular grinding assembly with an inlet in communication with the hopper, said grinding assembly featuring blades with a pinch face and an open face, said blades also including an axel that is coupled to the drive of a motor for turning the blades within the tubular grinding assembly;

a perforated insert with perforations wherein a grind is provided through a perforation after a bud is pinched between the perforated insert and the pinch face;

a sifting frame that is provided under the perforated insert and tubular grinding assembly, where the sifting frame is defined by a perforated metal tray;

a base that includes a jack and a pivot point for the sifting frame and tubular grinding assembly, wherein the jack is configured to move the sifting frame and tubular grinding assembly into a pitched angle relative to a foot of the base.

2. A method of grinding plant material via a grinder assembly comprising the steps of:

loading the material in a hopper that is in communication with an inlet of a tubular grinding assembly, said grinding assembly featuring blades with a pinch face and an open face, said blades also including an axel that is coupled to the drive of a motor for turning the blades within the tubular grinding assembly;

jacking the tubular grinding assembly around a pivot on a base to a pitched angle of incline relative to a foot of the base such that the tubular grinding assembly features a slope;

ensuring that the material is deposited into a perforated insert;

turning the blades at a rate of less than one revolution per second within the tubular grinding assembly such that the materials are tumbled, such that the materials fall down the slope of the tubular grinding assembly, and such that a grind is provided through a perforation of the perforated insert after a bud is pinched between the perforated insert and the pinch face; and, collecting the grind on a sifting frame defined by a perforated metal tray.

3. The method of claim 2 further wherein the base includes a jack such that the jack holds the sifting frame at the angle of incline.

4. The method of claim 3 further comprising the step of measuring the angle of incline via a compass on the base.

5. The grinder assembly of claim 1 further comprising a compass on the base for measuring the angle.

6. A method of grinding plant material, comprising:

loading plant material into a hopper connected to a tubular grinding assembly;

adjusting the tubular grinding assembly to a pitched angle using a jack and pivot point on a base;

rotating blades within the tubular grinding assembly;

tumbling the plant material down a slope created by the pitched angle of the tubular grinding assembly;

grinding the plant material between the blades and a perforated insert within the tubular grinding assembly; and collecting ground material that passes through perforations in the perforated insert.

7. The method of claim 6, wherein the motor is configured to rotate the blades at a rate between one-third and one revolution per second.

8. The method of claim 7, further comprising a compass on the base for measuring the pitched angle of the tubular grinding assembly.

9. The method of claim 8, wherein the perforated insert is removable for cleaning or changing perforation size.

10. The method of claim 9, further comprising a sifting frame with a perforated metal tray positioned below the perforated insert to collect ground material.

11. The method of claim 10, wherein the sifting frame is configured to oscillate to move the ground material over the perforated metal tray.

12. The method of claim 11, wherein the blades comprise a pinch face and an open face, and wherein the pinch face is configured to pinch plant material against the perforated insert.

13. The method of claim 12, wherein the perforations in the perforated insert have a diameter between $1/8$ inch and $3/16$ inch.

14. The method of claim 13, wherein the pitched angle is adjustable to optimize material flow for different plant material strains.

15. The method of claim 14, wherein the tubular grinding assembly is made of stainless steel to reduce microbial growth.

16. The method of claim 15, wherein the pitched angle of the tubular grinding assembly facilitates removal of stems from plant material as it tumbles down the slope created by the pitched angle.

* * * * *